(12) United States Patent
Wolf-Monheim

(10) Patent No.: US 10,576,887 B2
(45) Date of Patent: Mar. 3, 2020

(54) FEEDBACK OPERATION OF A VEHICLE BRAKE PEDAL

(71) Applicant: FORD GLOBAL TECHNOLOGIES, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/151,945

(22) Filed: Oct. 4, 2018

(65) Prior Publication Data
US 2019/0100137 A1   Apr. 4, 2019

(30) Foreign Application Priority Data
Oct. 4, 2017   (DE) .................... 10 2017 217 578

(51) Int. Cl.
| | |
|---|---|
| *B60Q 5/00* | (2006.01) |
| *B60T 17/22* | (2006.01) |
| *B60T 8/32* | (2006.01) |
| *B60T 7/04* | (2006.01) |
| *B60Q 9/00* | (2006.01) |
| *B60T 7/06* | (2006.01) |

(52) U.S. Cl.
CPC ............. *B60Q 5/005* (2013.01); *B60Q 9/00* (2013.01); *B60T 7/042* (2013.01); *B60T 7/06* (2013.01); *B60T 8/3255* (2013.01); *B60T 17/22* (2013.01)

(58) Field of Classification Search
CPC ............. B60T 7/00; B60T 7/04; B60T 7/02
See application file for complete search history.

(56) References Cited

U.S. PATENT DOCUMENTS

| | | | |
|---|---|---|---|
| 2,028,073 A | | 1/1936 | Lampert |
| 4,916,431 A | | 4/1990 | Gearey |
| 5,115,162 A | | 5/1992 | Leonard et al. |
| 5,230,549 A | | 7/1993 | Osada et al. |
| 5,835,008 A | * | 11/1998 | Colemere, Jr. ........ B60Q 1/441 340/439 |

(Continued)

FOREIGN PATENT DOCUMENTS

| | | |
|---|---|---|
| DE | 10306156 A1 | 8/2004 |
| DE | 102010032772 A1 | 2/2012 |

(Continued)

OTHER PUBLICATIONS

DE Exam Report for DE 10 2017 217 578.8 dated Sep. 14, 2018, 8 pages.

*Primary Examiner* — Omeed Alizada
(74) *Attorney, Agent, or Firm* — Raymond Coppiellie; Brooks Kushman P.C.

(57) ABSTRACT

The disclosure relates to a method for operating a brake pedal unit of a vehicle, comprising feedback to a driver. The brake pedal unit has a multiplicity of pressure-sensitive or force-sensitive sensors. According to the disclosure, in the method, output signals of the multiplicity of pressure-sensitive or force-sensitive sensors are detected. At least one position and/or an orientation of the operator's foot relative to the foot support element is determined from the detected output signals. A feedback signal that characterizes the determined position and/or orientation is output at an output unit of the vehicle.

14 Claims, 4 Drawing Sheets

(56) References Cited

U.S. PATENT DOCUMENTS

| | | | |
|---|---|---|---|
| D425,838 S | 5/2000 | Hussaini | |
| 6,556,149 B1 | 4/2003 | Reimer et al. | |
| 8,326,505 B2 | 12/2012 | Cesario et al. | |
| 2017/0259797 A1 | 9/2017 | Serrand | |
| 2019/0064870 A1* | 2/2019 | Krehl | B60Q 9/00 |

FOREIGN PATENT DOCUMENTS

| | | |
|---|---|---|
| DE | 102014019124 A1 | 6/2016 |
| EP | 1413482 A1 | 4/2004 |
| JP | 5402897 A1 | 1/2014 |
| KR | 101447467 B1 | 11/2014 |
| KR | 20160103644 A | 9/2016 |

* cited by examiner

FEEDBACK OPERATION OF A VEHICLE BRAKE PEDAL

CROSS-REFERENCE TO RELATED APPLICATIONS

This application claims foreign priority benefits under 35 U.S.C. § 119(a)-(d) to DE Application 10 2017 217 578.8 filed Oct. 4, 2017, which is hereby incorporated by reference in its entirety.

TECHNICAL FIELD

The disclosure relates to a method and unit that provides feedback to an operator of the brake pedal unit.

BACKGROUND

It is known in the field of vehicle technology to control hydraulic pressure of a brake installation in an indirect manner by equipping a brake pedal with a sensor, or a plurality of sensors whose detected signals are used in actuation of the brake pedal for the purpose of controlling the brake installation.

For example, U.S. Pat. No. 8,326,505 B2 describes a control system for an electromechanical brake system provided with actuation elements, which are designed to actuate brake elements for the purpose of exerting a braking action. The control system has a control stage for the purpose of controlling the braking action on the basis of a brake reference signal. The control stage comprises a model-based, predictive control block, in particular of a generally predictive, self-adaptive controller type, which operates on the basis of a control variable that represents the braking action. The control system further has a model identification stage, which determines parameters that identify a transmission function of the electromechanical brake system, and a regulating stage, which determines an optimum value of parameters of the control system inherent to a controller using a value of identification parameters. A braking force requested by a driver is ascertained by provided sensors, which detect, for example, an angle and movement speed of the brake pedal.

U.S. Pat. No. 5,230,549 A further describes a motor vehicle brake system comprising braking-force-generating apparatuses, which are mechanically separated from a brake pedal and can be controlled to exert braking forces on wheels in response to a detected pressing-down of the brake pedal. The brake system has a sensor for detecting a displacement of the brake pedal and a sensor for detecting a force exerted on the brake pedal. The braking-force-generating apparatuses are controlled by a controller based on a detected displacement of the brake pedal and a detected force applied to the brake pedal.

The signals that are detected when the brake pedal is actuated can also be used for the purpose of improving safety.

DE 10 2014 211 008 A1, for example, describes a sensor apparatus and a method for executing or boosting an autonomous build-up of brake pressure in a brake system by an active, braking-force booster. Reliable options for early recognition of brake pedal blocking during an autonomous, or partially autonomous build-up of brake pressure in at least one-wheel brake cylinder of a brake system is intended to be provided. The sensor apparatus for a brake system comprises an active braking force booster designed for executing, or boosting, an autonomous, or partially autonomous build-up of brake pressure, has an electronics device, which, at least during the autonomous, or partially autonomous build-up of brake pressure that is executed, or boosted, by means of the active braking force booster, is designed to output at least one activation signal to a warning display apparatus, and/or a warning tone output apparatus, and/or at least one control signal to the active braking force booster taking into account at least one deformation variable with respect to a deformation of the active braking force booster, said variable being set by the sensor apparatus or provided externally, and/or a traction exerted on a brake pedal of the brake system and causing the deformation, in order to control said active braking force booster in a safety mode at least for a prescribed first time interval, or to interrupt said active braking force booster at least for a prescribed second time interval.

JP 5402897 B2 further describes an apparatus for determining faulty operation of a gas pedal during intended actuation of a brake pedal. A pressure-sensitive sensor is, or a plurality of pressure-sensitive sensors are, provided on a bottom side of a gas pedal in a region of the gas pedal that is close to the brake pedal. When a pressure force on the gas pedal is detected by means of the pressure-sensitive sensor during actuation of the brake pedal by an instance of slipping off, actuation of the gas pedal is assessed as a faulty operation by a control unit. As a result thereof, the faulty operation of the gas pedal can be determined before an arm of the gas pedal is moved in a rotating manner.

It is further known to exert mechanical, retroactive effects on a brake pedal of a vehicle in order to prevent disadvantageous influences of pedal feel for a driver, for example in the case of a regenerative braking process. When the pedal feel does not correspond to an expectation of the driver, this can lead to excessive or insufficient braking, as a result of which driving safety is negatively influenced.

For example, KR 101447467 B1 proposes a pedal simulator for an active brake apparatus. The pedal simulator is installed in a main brake cylinder and receives fluid pressure, which corresponds to a pedal force of an operator. The pedal simulator serves to make it possible for an operator to sense pressing of a pedal. The pedal simulator comprises a simulator block in which an oil bore, which is connected to the main cylinder, is formed on an upper part. Furthermore, a bore is provided on an inside, which is connected to the oil bore; a connected damping housing, which is provided to seal off a lower end of the bore; a first reaction force unit, which is provided in the bore, which is pressurized by oil fed by the main brake cylinder and provides a reaction force; and a second reaction force unit, which is borne by the damping housing and is compressed when the first reaction force unit is pressurized and delivers the reaction force, wherein the second reaction force unit is elastically deformed in order to cover the upper end of the damping housing.

In addition to the use of classic switches and/or pressure sensors, it is known to use pressure sensors that are easily deformable in connection with vehicle pedals.

U.S. Pat. No. 6,556,149 B1, for example, describes switches and joysticks comprising a non-electrical, deformable, pressure sensor. Switches and joysticks comprise user-friendly, two-position and multi-position switches, including simple on/off and variable switches like dimmers, for example. The switches operate in accordance with the principle of detecting a position of a switching arm that can be grasped by a user, a part of said switching arm bearing on a pressure-sensitive pad. The pad is a deformable material, which recognizes and localizes pressure on the pad by emitting an energy wave, for example in the form of light, into a matrix of the pad, and detecting an intensity thereof. Since the pad is compressed locally, the intensity of the energy wave in a region around compression increases. The position of a switching arm can thus be recognized and information transmitted to a central processing unit for further processing.

Furthermore, U.S. Pat. No. 6,556,149 B1 proposes a deformable, pressure sensor on a vehicle pedal, such as a brake pedal, for example. The vehicle pedal is equipped with a deformable pad on a user-contact face, said pad being connected to one or more emitter/detector pairs. In this case, the pad is compressed by pressure from a foot of a user against the pedal, and a corresponding proportional signal is transmitted to a control unit.

In view of the prior art described, the field of sensor systems in connection with pedals of vehicles leaves room for improvement.

SUMMARY

The disclosure is based on an object of providing a brake pedal of a vehicle in connection with a sensor system, and a method for operating such a brake pedal that achieves an increased level of driving comfort and/or an increased level of driving safety.

It is to be pointed out that features and measures specified individually in the following description may be combined with one another in any desired, technically meaningful way and disclose further configurations of the disclosure. The description, in particular in conjunction with the Figures, characterizes and specifies the disclosure.

The method according to the disclosure for operating a brake pedal unit of a vehicle, comprising feedback to an operator of the brake pedal unit, is executed using a brake pedal unit, which has a multiplicity of pressure-sensitive or force-sensitive sensors, such as an array of microelectromechanical, pressure sensors.

The method is characterized by at least the following steps: detecting output signals of a multiplicity of pressure-sensitive or force-sensitive sensors, determining at least one variable from a position and orientation of an operator's foot relative to a foot support element from detected output signals, and outputting a feedback signal that characterizes a determined variable at an output unit that is accessible to the operator.

A "vehicle" is to be understood within the context of this disclosure as meaning, in particular, a passenger, motor vehicle, a truck or a bus. The term "multiplicity" is intended to be understood within the context of the disclosure as meaning, in particular, a number of at least two. In general, the operator of the brake pedal unit is also a driver of the vehicle.

Feedback to an operator of the brake pedal unit is provided by a generated feedback signal. The feedback to the operator of the brake pedal unit (the driver of the vehicle) can make it possible to immediately correct a position or orientation of the operator's foot relative to the foot support element. As a consequence of a correction, a more effective braking process, an increased level of driving safety and an increased level of driving comfort for the driver of the vehicle can be achieved. In particular, by familiarizing the driver with corrections, a more effective braking process can be learned, and an insufficient braking process in the event of a necessary, emergency braking can be prevented.

The feedback signals can be formed, for example, as acoustic and/or optical signals.

In preferred embodiments, the method is executed using a brake pedal unit of the vehicle, comprising a brake pedal having a brake pedal rod and a foot support element connected to the brake pedal rod, and a pedal pad that is arranged on the foot support element and can be elastically deformed by a foot-imparted force of an operator, wherein sensors of a multiplicity of pressure-sensitive, or force-sensitive sensors, are covered by the pedal pad, and are at least operatively connected to the foot support element and connected (in terms of communication signal technology) to an electronic evaluation unit.

The term "operatively connected" is intended to be understood in this context as meaning, in particular, that operatively connected objects are connected to one another in such a way that a transmission of a force and/or a torque between the objects is possible. The transmission can in this case be carried out both by direct contact as well as indirectly, by an intermediate element.

The method contains at least the following additional steps: comparing detected, output signals with at least one predetermined condition with respect to a local distribution of pressure, or force, on the foot support element, determining at least one variable from a position and an orientation of the operator's foot relative to the foot support element, based on a result of the comparing detected, output signals, and generating a feedback signal that characterizes the variable.

Using the method, the position and/or orientation of the operator's foot can be determined effectively, and a feedback signal can be provided for output.

In preferred embodiments, the method contains the following additional steps: determining the at least one variable at at least two different points in time, ascertaining a difference of the at least one variable determined at the at least two different points in time, generating a feedback signal that characterizes a difference of the at least one determined variable when a predetermined, threshold value for the difference is exceeded, and outputting the feedback signal from the output unit in a manner that is communicated to the operator.

In this way, the operator of the brake pedal unit can be made aware of a movement of the operator's foot relative to the foot support element, as a result of which it is possible to counteract the operator's foot potentially slipping off the foot support element, and also to increase a level of driving safety as a result.

A time difference between the at least two different points in time is preferably short with respect to a delay time of the operator's foot on the foot support element during a braking process.

The step of detecting the output signals of the multiplicity of pressure-sensitive, or force-sensitive sensors is preferably carried out continuously or quasi-continuously, as a result of which a sufficiently meaningful tracking of the position and/or orientation of the operator's foot relative to the foot support element during a braking process can be achieved. The term "quasi-continuously" is intended to be understood within the context of this disclosure as meaning, in particular, that a duration of a typical braking process is greater by at least a factor of 20 than a sampling period in detection of output signals of the sensors.

Performance of the step of comparing the detected output signals is preferably dependent on fulfilment of at least one condition with respect to a variable of at least one of the detected output signals. As a result, thereof, it is possible to easily achieve a situation in which the method is executed only during a braking process. For example, a condition can be formulated in such a way that respective signals generated by a predetermined number of sensors have to exceed a predetermined threshold value.

In preferred embodiments of the method, the step of generating an output signal that characterizes the determined variable comprises generating voice information. "Voice information" is to be understood within the context of the disclosure as meaning, in particular, a linguistic text that can be output as spoken text and/or in written form by a suitable output unit. In this way, feedback can be provided promptly and clearly to the operator of the brake pedal unit with respect to the position and/or the orientation of the operator's foot relative to the foot support element and/or a potential slip of the operator's foot off the foot support element.

The step of outputting the feedback signal preferably contains outputting the feedback signal at a driver information system ("DIS") or infotainment system of a vehicle. Since driver assistance systems, such as an on-board computer, for example, in modern vehicles constitute one of the main items of information for drivers of vehicles, it is possible to thereby ensure with a high degree of probability, that an output of the feedback signal reaches the driver.

In another aspect of the disclosure, a brake pedal unit of a vehicle, comprising feedback to an operator of the brake pedal unit, is provided. The brake pedal unit has: a brake pedal comprising a brake pedal rod and a foot support element connected to the brake pedal rod, a multiplicity of pressure-sensitive, or force-sensitive sensors arranged on the foot support element, said sensors being at least operatively connected to the foot support element, and an electronic evaluation unit, which is connected in terms of communication (electrical signal technology) to the multiplicity of sensors.

In this case, a pedal pad that can be elastically deformed by a foot-imparted force of an operator is arranged on the foot support element. The sensors, or the multiplicity of pressure-sensitive or force-sensitive sensors, are covered by the pedal pad, and the electronic evaluation unit is provided for automatic execution of the method according to the disclosure.

The term "provided" is intended to be understood within the context of the disclosure as meaning, in particular, specifically programmed, designed or arranged.

The advantages described in connection with the disclosed method can be applied in their entirety to the proposed brake pedal unit.

When the electronic evaluation unit of the brake pedal unit comprises at least one processor unit and a digital data storage unit to which the processor unit has access in terms of data technology, an automatic, flexible and reliable execution of the method can be made possible.

In particular, the processor unit and/or the digital data storage unit can be part of a microcontroller. Nowadays, microcontrollers of this kind are commercially available in a variety of forms at economical prices. Predetermined threshold values, detected output signals and local distributions of pressure or force, and conditions relating thereto disclosed in this application can advantageously be stored in the digital data storage unit, as a result of which rapid data access can be achieved.

In preferred embodiments of the brake pedal unit, the sensors of the multiplicity of pressure-sensitive or force-sensitive sensors are arranged on the foot support element at positions of grid points of a virtual, two-dimensional, uniform, geometric grid. In this case, the grid covers a predominant part of a surface of the foot support element.

The term "predominant part" should be understood within the context of the disclosure as meaning, in particular, a proportion of more than 50% of the surface, preferably of more than 70% of the surface and, particularly preferably, of more than 90% of the surface of the foot support element. In particular, the term is intended to include an option of the surface of the foot support element being covered completely, that is to say at 100%, by the virtual grid.

The proposed arrangement of the sensors of the multiplicity of sensors can achieve effective determination of a position and/or an orientation of the operator's foot relative to the foot support element.

A "uniform grid" is intended to be understood within the context of the disclosure as meaning a grid, which has, in each of two independent directions, a uniform spacing between two grid points adjacent in a respective direction. The spacings in the two independent directions can be identical; however, the spacings can also be different from one another. The two independent directions can be arranged perpendicularly to one another; however, the two independent directions can also form an angle that deviates from a right angle.

The virtual, two-dimensional, uniform, geometric grid can preferably have, in the case of a curved surface of the foot support element in one direction, a curvature, as a result of which the virtual grid can be adjusted particularly well to a surface of the curved foot support element.

In preferred configurations of the brake pedal unit, the pedal pad that can be elastically deformed by a foot-imparted force of an operator has a cushion made from at least one elastomer. As a result, thereof, during a braking process, deformation of the pedal pad caused by the foot-imparted force of the operator can achieve a more, uniform, contact pressure that acts perpendicularly on the foot support element.

In a further aspect of the disclosure, a software module configured to control an automatic execution of steps of the disclosed method is proposed.

The method steps to be performed are converted to a program code of the software module, wherein the program code can be implemented in a digital storage unit and executed by a processor unit. The digital storage unit and/or the processor unit can preferably be a digital storage unit and/or a processor unit of the electronic evaluation unit. As an alternative or in addition, the processor unit can be a separate processor unit, which serves, in particular, to execute at least some of the method steps.

The software module can make it possible to automatically execute, in a robust and reliable manner, the method and flexible modifications of method steps, and stored predetermined threshold values, detected output signals and local distributions of pressure or force and conditions relating thereto.

Further, advantageous configurations of the disclosure are disclosed in the following description of the Figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different Figures, identical parts are always provided with the same reference signs, and so said parts are generally also described only once.

Figure 1:
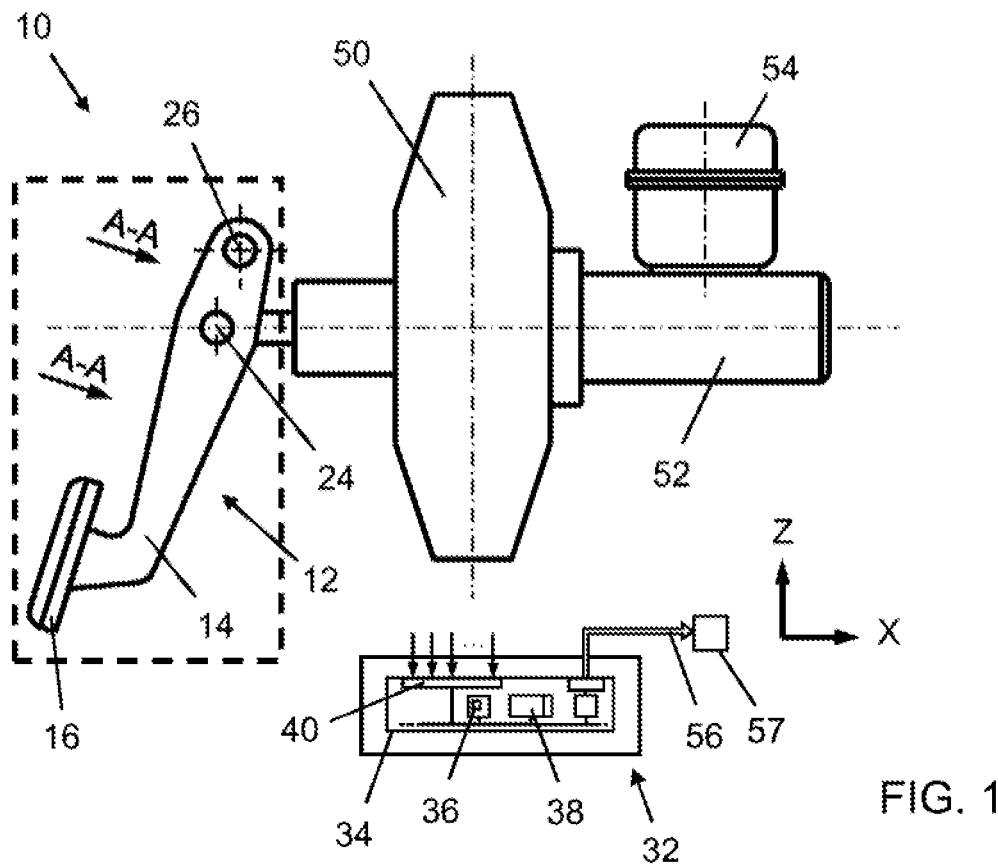
FIG. 1 shows a schematic, side view of a brake pedal unit according to the disclosure as part of a brake installation of a vehicle.
Figure 2:
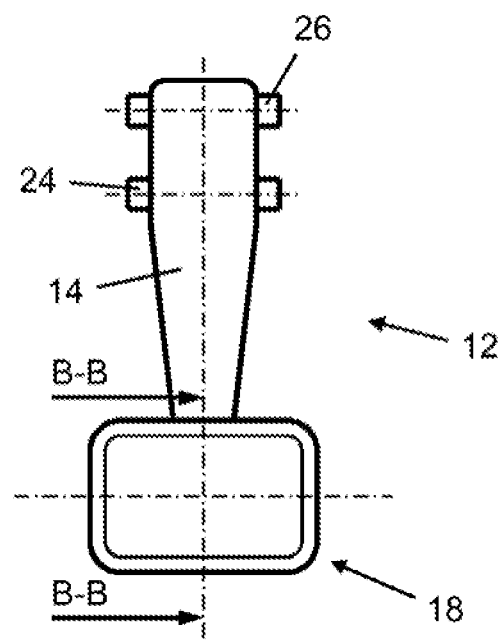
FIG. 2 shows parts of the brake pedal unit according to FIG. 1 in a schematic view from direction A-A.

FIG. 1 shows a schematic side view of one possible embodiment of a brake pedal unit 10 according to the disclosure as part of a brake installation of a vehicle. The brake pedal unit 10 comprises a brake pedal 12 having a cranked brake pedal rod 14 and a foot support element 16 fixedly connected to the brake pedal rod 14 at a cranked end, said foot support 16 element having a planar surface.

The brake pedal 12 is connected to a braking force booster 50 of the brake installation in a manner known per se by a lower articulated connection 24. The braking force booster 50 is connected in terms of flow technology to a main brake cylinder 52 and an equalizing container 54 of the brake installation. An upper end of the brake pedal rod 14 is hinged to the vehicle body (not illustrated) by an upper articulated connection 26.

Figure 3:
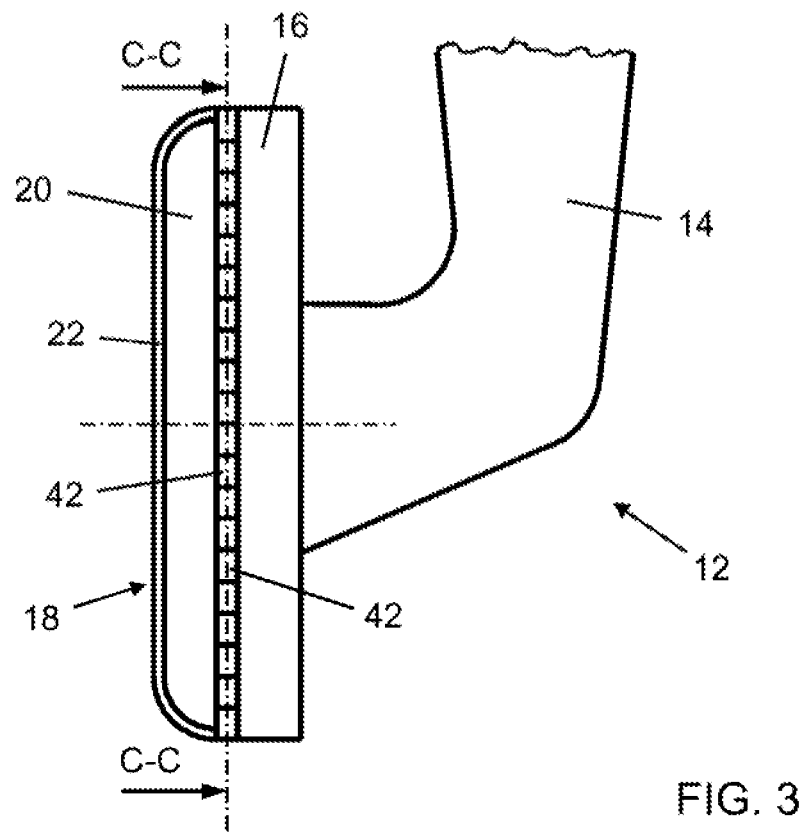
FIG. 3 shows a detail of the brake pedal unit according to FIG. 1 in a schematic, cut, side view from direction B-B.
Figure 4:
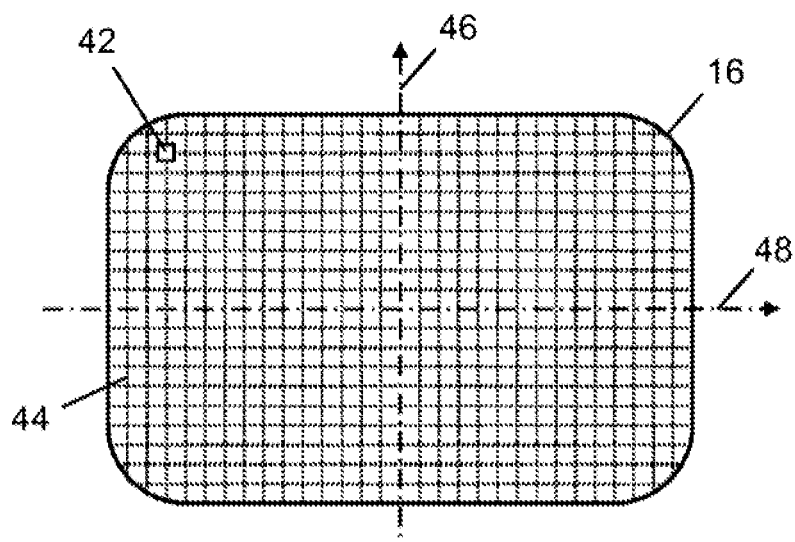
FIG. 4 shows a schematic view of a multiplicity of pressure-sensitive sensors of the brake pedal unit according to FIG. 1 from direction C-C.

As can be seen most clearly from FIGS. 3 and 4, the brake pedal unit 10 providing feedback to an operator also has a multiplicity of pressure-sensitive sensors 42, which are arranged directly on the foot support element 16 and are operatively connected to the foot support element 16 in this way. Suitable pressure-sensitive sensors 42 of this kind, for example film sensors, are known to those skilled in the art and therefore do not have to be described in more detail at this point.

Furthermore, a pedal pad 18 is arranged on the foot support element 16 (FIG. 3) so that the sensors 42 of the multiplicity of pressure-sensitive sensors 42 are completely covered by the pedal pad 18. The pedal pad 18 has a cushion 20 produced from an elastomer facing toward the multiplicity of sensors 42. A surface of the cushion 20 that faces away from the multiplicity of sensors 42 is covered by a separate elastomer coating 22. The cushion 20 can be elastically deformed by a foot-imparted force 30 by/from an operator that typically occurs during a braking process, as illustrated by FIGS. 5A-5C.

FIG. 4 shows a schematic front view of the multiplicity of pressure-sensitive sensors 42 of the brake pedal unit 10. Each sensor 42 of the multiplicity of sensors 42 (only one of the sensors is illustrated as representative) is arranged on the foot support element 16 at a position of a grid point of a virtual, two-dimensional, uniform, geometric grid 44, which completely covers the planar surface of the foot support element 16. In each of two directions 46, 48 arranged perpendicularly to one another, the virtual grid 44 has a uniform spacing between two grid points adjacent in the respective direction 46, 48.

Figure 5:
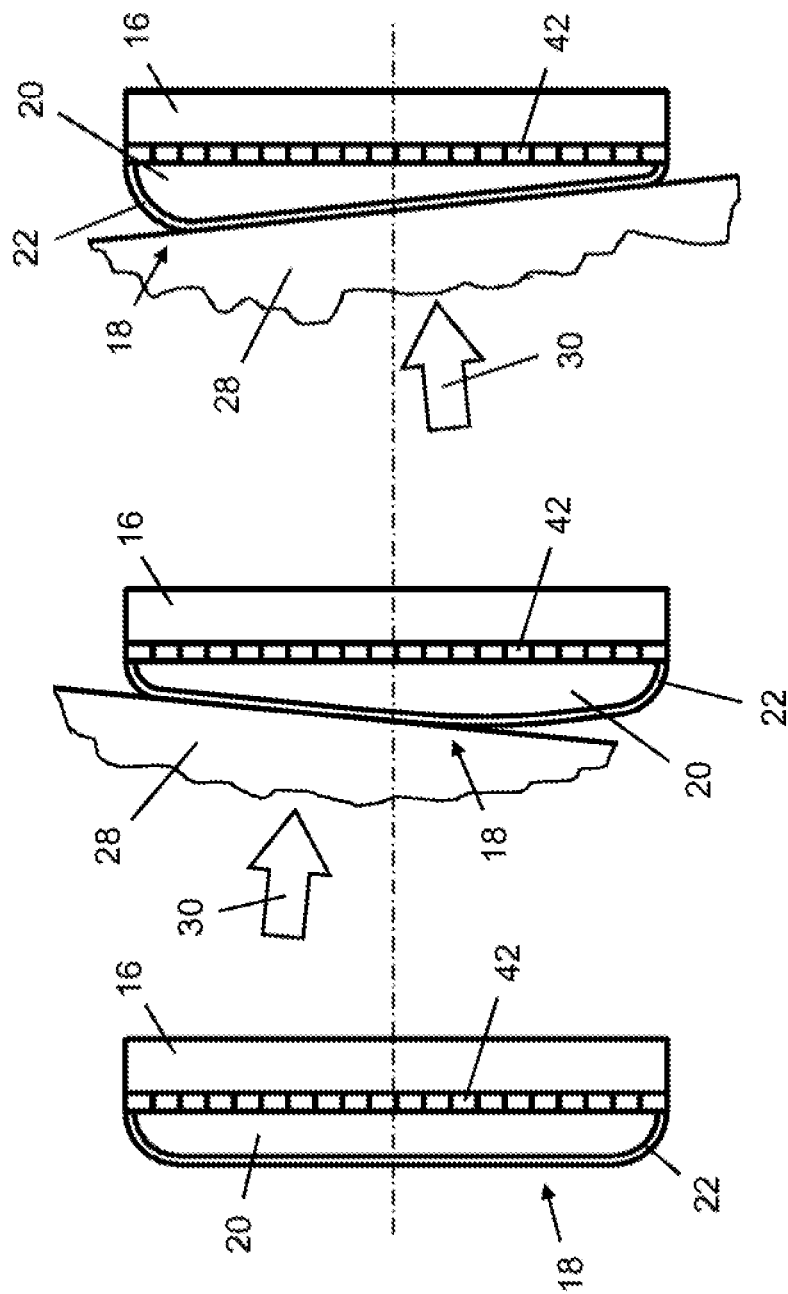
FIG. 5A is a schematic, sectioned, side view showing the brake pedal unit according to FIG. 1 in a resting state with no force applied thereto.
FIG. 5B shows the brake pedal unit according to FIG. 5 with a force having a downward-directed component applied by an operator's foot.
FIG. 5C shows the brake pedal unit according to FIG. 5 with a force having a upward-directed component applied by an operator's foot.

FIG. 5A shows a schematic, sectioned, side view of the foot support element 16 comprising the pedal pad 18, the cushion 20, the elastomer coating 22 and the multiplicity of sensors 42 in a state without an acting foot-imparted force. FIGS. 5B and 5C show effects of foot-imparted forces 30 acting in different directions on the elastically deformable pedal pad 18 of the brake pedal unit 10 according to FIG. 1 by an operator's foot 28 during a braking process. FIG. 5B shows a foot-imparted force 30 having a downward-directed component, and FIG. 5C shows a foot-imparted force 30 having an upward-directed component. It becomes clear to see that a more uniform contact pressure that acts perpendicularly on the foot support element 16 is achieved by the deformable pedal pad 18 than in the case of a rigid pedal pad.

With reference to FIG. 1, the brake pedal unit 10 further comprises an electronic evaluation unit 32, which is arranged in the vehicle at a suitable location, for example below the dashboard (not shown). The electronic evaluation unit 32 includes a microprocessor 34 comprising a processor unit 36 and a digital data storage unit 38 to which the processor unit 36 has access in terms of data technology. Signal output lines (indicated schematically in FIG. 1 by arrows directed toward multiplexers 40) of the multiplicity of sensors 42 are connected in terms of signal technology to signal inputs of multiplexers 40 of the microprocessor 34. The multiplexers 40 are provided to feed output signals of the sensors 42 to a respective digital-to-analog converter (DAC; not illustrated) for the purpose of preparing for subsequent digital signal processing. As described in further detail hereinbelow, the electronic evaluation unit generates and outputs a feedback signal 56 to an output unit 57 which may be, for example, a driver information system or an infotainment system of the vehicle which communicates pertinent information to the vehicle driver (brake pedal operator).

Figure 6:
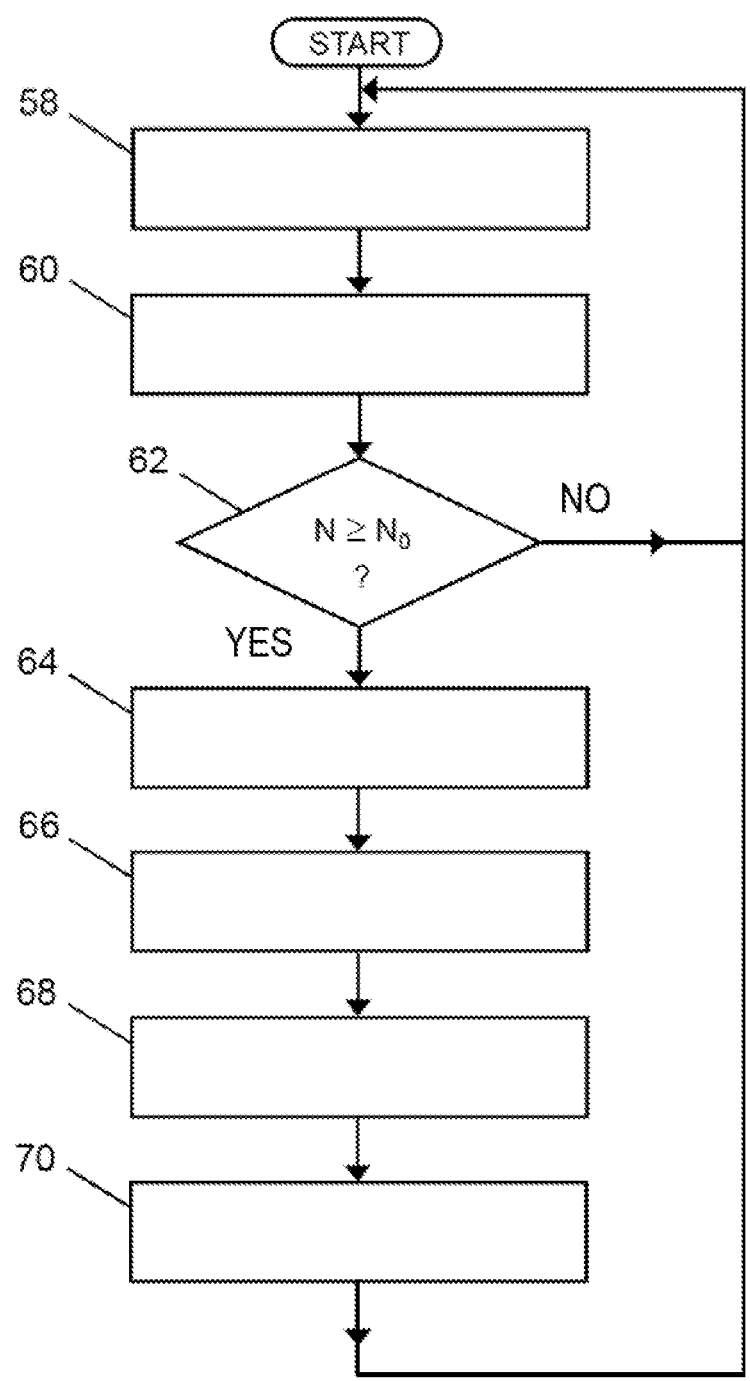
FIG. 6 shows a flowchart of a method according to the disclosure for operating the brake pedal unit according to FIG. 1.

One possible inventive embodiment of a method for operating the brake pedal unit 10 comprising feedback to the driver of a vehicle according to FIG. 1 is described hereinafter. A flowchart of the method is illustrated in FIG. 6.

The electronic evaluation unit 32 is provided for automatic execution of the method and, to this end, contains a software module for the automatic execution of the steps of the method, wherein said method steps to be executed are present as executable program code, which is stored in the digital data storage unit 38 of the electronic evaluation unit 32, and can be executed by the processor unit 36 of the electronic evaluation unit 32.

In preparation for the performance of the method, it is assumed that all apparatuses and components involved are in an operationally ready state.

In a step 58 of the method, the output signals of the multiplicity of pressure-sensitive sensors 42 are detected by the electronic evaluation unit 32. A step 58 of detecting the output signals is executed periodically at a sampling rate that corresponds to quasi-continuous detection as soon as ignition of the vehicle is switched on. In a step 60, detected output signals are compared with a predetermined lower threshold value for the output signals of the sensors, for example for a height of the output signals, and, in a step 62, are subjected to a subsequent condition query. When a predetermined number of No output signals of the sensors 42, in this specific configuration of two sensors, exceeds a predetermined lower threshold value, the condition query 62 has a positive output, and the method is continued with the next step 64.

In a step 64 of the method, the detected output signals from the electronic evaluation unit 32 are compared with predetermined conditions with respect to a local distribution of pressure (applied by the operator's foot 28) on the foot support element 16. In a step 66 of the method, a position of the operator's foot 28 relative to the foot support element 16 is determined based on a result of the comparison 64. In a step 68 of the method, a feedback signal 56 that characterizes a position of the operator's foot 28 is generated by the electronic evaluation unit 32 as feedback to the operator of the brake pedal unit 10, or driver of the vehicle. In a step 70, feedback signal 56 is output or communicated by an output unit 57, for example a driver information system or an infotainment system of the vehicle, by which pertinent information characterized by the feedback signal is communicated in an easily-understood manner to the driver/operator.

As an example of a multiplicity of potential, predetermined conditions with respect to a local distribution of the pressure on the foot support element 16, mention is made of a calculated position of a signal focal point of the output signals of the multiplicity of pressure-sensitive sensors 42 exceeding a predetermined spacing from a center of the foot support element 16. In this case, the electronic evaluation unit 32 can generate a feedback signal 56, which is to be output at the output unit and is composed of a visual sign, for example a warning triangle comprising additional text, and/or corresponding voice information, which is to be output by the driver information system.

A further example is determination of the signal focal point of the output signals of the multiplicity of pressure-sensitive sensors 42 at different points in time and determination of a difference of a position of the signal focal point between successive points in time. If the ascertained difference exceeds a predetermined threshold value for the difference, a feedback signal 56 that characterizes the difference of the positions of the signal focal points is generated by the electronic evaluation unit 32 and output at the output unit, for communication to the driver in a manner which is easily understood to the driver, for example in text form and/or as voice information.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for operating a brake pedal of a vehicle, comprising:
   detecting signals generated by a multiplicity of pressure-sensitive sensors arranged on a foot support element;
   comparing the signals with a minimum threshold value;
   determining, when the signals exceed the minimum threshold value, that a braking process is occurring;
   only upon the determination of the braking process, comparing the signals with at least one predetermined condition with respect to a local distribution of pressure on the sensors;
   determining from the comparison a variable characterizing at least one of a position and an orientation of an operator's foot relative to the foot support element; and
   communicating a feedback signal characterizing the variable to the operator.

2. The method as claimed in claim 1, wherein the communicating of the feedback signal comprises generation of voice information.

3. The method as claimed in claim 1, wherein the communicating of the feedback signal comprises generation a visual sign.

4. The method as claimed in claim 1 further comprising:
   determining the at least one variable at a first and a second point in time;
   ascertaining a difference between the variable determined at the first and second points in time; and
   wherein the feedback signal is generated in a manner characterizing the difference between the determined variable only when a predetermined threshold value for the difference is exceeded.

5. The method as claimed in claim 1, wherein the detecting of the signals of the multiplicity of pressure-sensitive is continuous.

6. A method for operating a brake pedal of a vehicle, comprising:
   operating a multiplicity of pressure-sensitive sensors arranged on a foot support element to generate signals;
   determining that a braking process is occurring if the signals exceed a minimum threshold value;
   only upon the determination of the braking process, operating an electronic evaluation unit receiving the signals to determine therefrom a variable characterizing at least one of a position and an orientation of an operator's foot relative to a foot support element; and
   operating an output unit to generate a feedback signal characterizing the variable and communicate the feedback signal to the operator.

7. The method as claimed in claim 6, wherein the communicating of the feedback signal comprises generation of voice information.

8. The method as claimed in claim 6, wherein the communicating of the feedback signal comprises generation a visual sign.

9. A brake pedal unit of a vehicle, comprising:
   a foot support element;
   a multiplicity of pressure-sensitive sensors arranged on the foot support element; and
   an electronic evaluation unit receiving signals from the multiplicity of sensors and operative to:
   compare the signals with a minimum threshold value,
   determine that a braking process is occurring if the signals exceed the minimum threshold value,
   compare, only upon the determination of the braking process, the signals with at least one predetermined condition with respect to a local distribution of pressure on the sensors,
   generate, in response to the comparison, a variable characterizing a position and an orientation of an operator's foot relative to the foot support element as indicated by the signals, and
   output a feedback signal characterizing the variable.

10. The brake pedal unit as claimed in claim 9, wherein the electronic evaluation unit includes at least one processor unit and a digital data storage unit to which the processor unit has access.

11. The brake pedal unit as claimed in claim 9, wherein the pressure-sensitive sensors are arranged on the foot support element at positions of grid points of a virtual, two-dimensional, geometric, uniform grid.

12. The brake pedal unit as claimed in claim 9, further comprising a pedal pad covering the multiplicity of pressure-sensitive sensors and elastically deformable by a foot-imparted force applied to the foot support element.

13. The brake pedal unit as claimed in claim 9, wherein the feedback signal comprises voice information.

14. The brake pedal unit as claimed in claim 9, wherein the electronic evaluation unit generates the feedback signal in a manner to characterize a difference between the variable determined at a first and a second point in time, and only when the difference exceeds a predetermined threshold value.

* * * * *